T. LARSSON.
OPERATING MEANS FOR ELEVATORS.
APPLICATION FILED MAY 4, 1909.
1,125,133.
Patented Jan. 19, 1915.
2 SHEETS—SHEET 1.
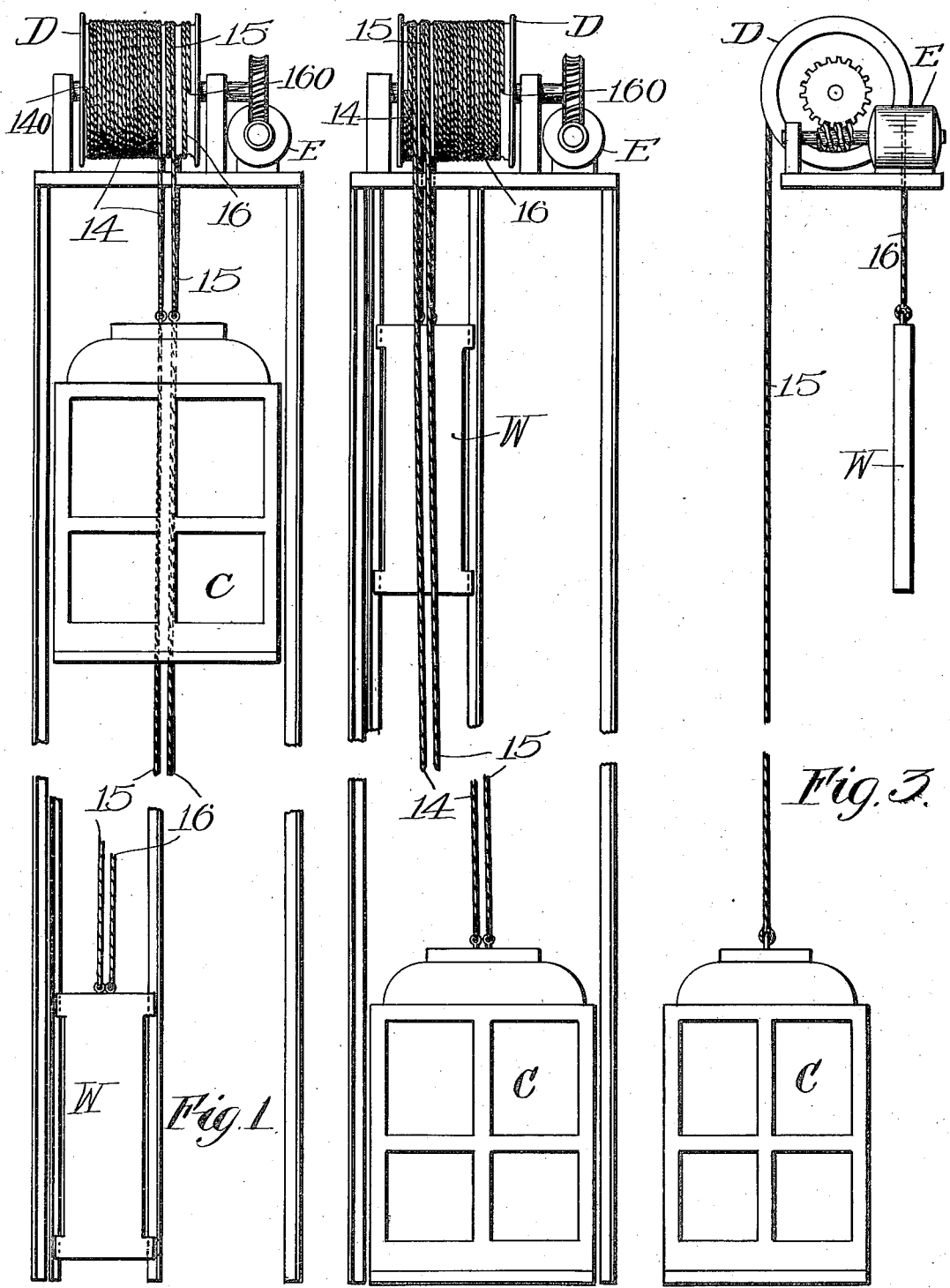

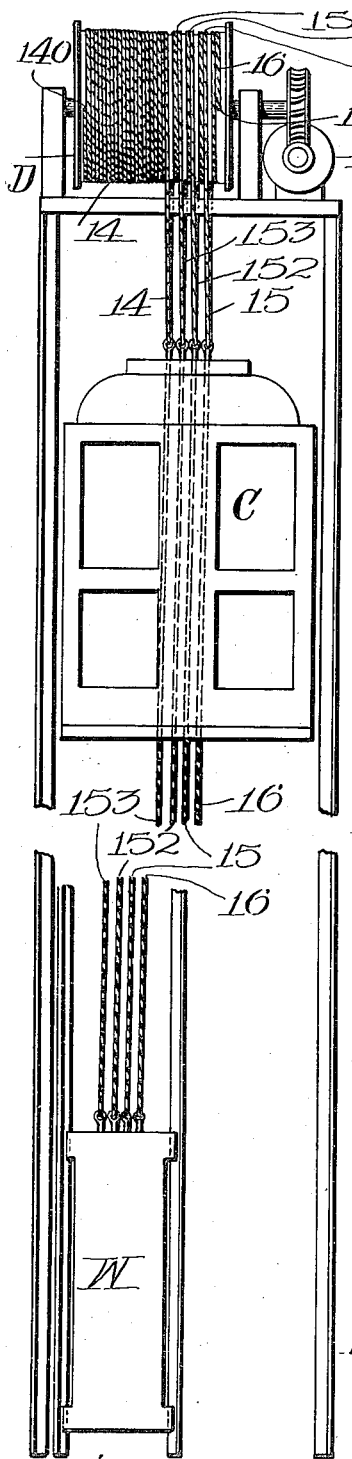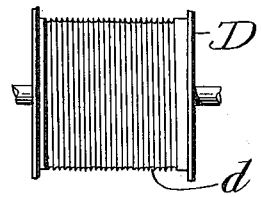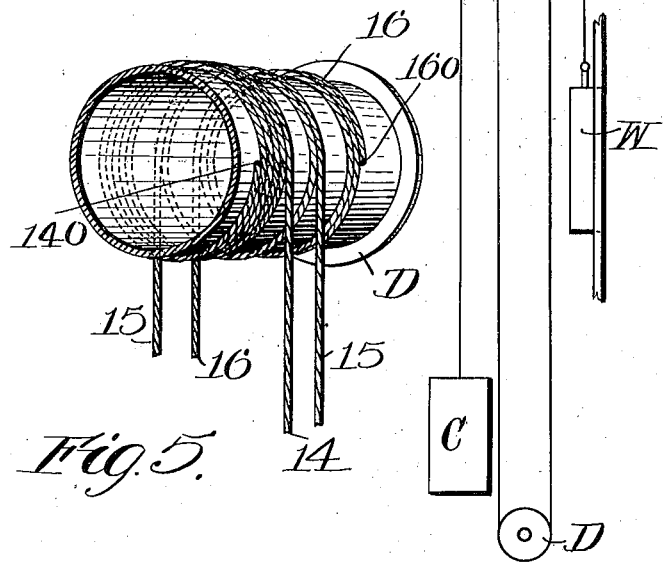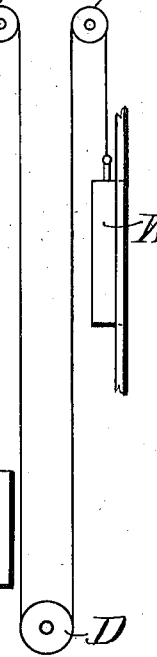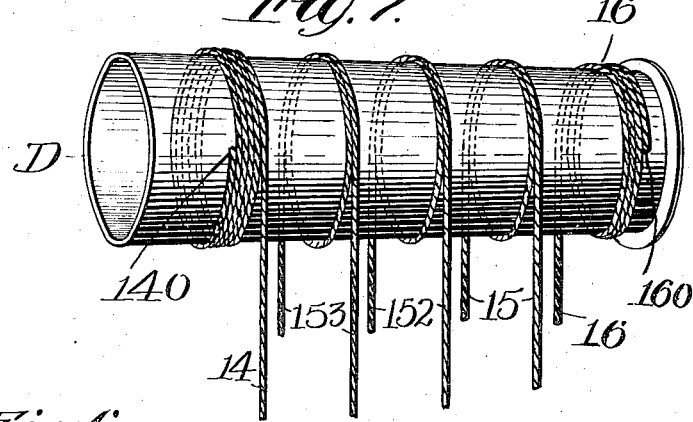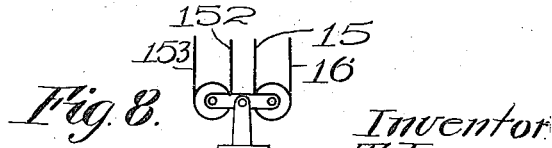

UNITED STATES PATENT OFFICE.

THURE LARSSON, OF WORCESTER, MASSACHUSETTS, ASSIGNOR OF ONE-THIRD TO WILLIAM E. D. STOKES AND ONE-THIRD TO FREDERICK A. JONES, BOTH OF NEW YORK, N. Y.

OPERATING MEANS FOR ELEVATORS.

1,125,133.  Specification of Letters Patent.  Patented Jan. 19, 1915.

Application filed May 4, 1909. Serial No. 493,988.

*To all whom it may concern:*

Be it known that I, THURE LARSSON, a citizen of the United States, residing at Worcester, in the county of Worcester and State of Massachusetts, have invented a new and useful Operating Means for Elevators, of which the following is a specification.

The object of this invention is to provide a new and improved operating means for elevators and particularly for elevators having long runs.

On account of the difficulty of making a drum large enough to hold the necessary lengths of ropes for long run elevators, it is the present practice in long run elevators to connect the car and counter-weight by a plurality of ropes and to turn the ropes back and forth between a series of sheaves so that the ropes will have a traction engagement therewith, and to apply power to rotate these sheaves whereby the friction or traction of the ropes on the sheaves will operate the elevator. This traction device as thus far constructed is open to serious defects among which may be noted that as dependence is placed entirely upon friction, considerable slippage takes place when the power is suddenly applied or shut off, which friction rapidly wears the ropes rendering frequent replacements and repairs necessary.

I have overcome this difficulty by providing a drum to which the power is applied and around which the rope or ropes connecting the car and counter-weight is or are coiled to obtain a traction engagement therewith. Each rope is preferably given a full wrap and a half wrap around the drum to obtain a large amount of traction, although in some instances the rope is given a larger number of full turns and a half turn. Preferably a number of ropes are arranged between the counter-weight and the car and each rope is coiled around the driven drum in the before described manner.

The drum has a screw-threaded groove cut in its periphery for the ropes to engage. This permits the use of a drum of convenient size, say a drum ten feet in circumference, because the ropes do not have to be wound thereon, the portion of the ropes which are not coiled around the drum extending up and down the well from the car to the counter-weight. This arrangement will give a large traction on the drum and will enable the car to be smoothly operated. To prevent displacement of these traction ropes on the periphery of the drum, one or more direct acting ropes are employed. Two such ropes are preferably employed and one rope is connected to the car and to the drum; and the other rope is connected to the counter-weight and to the drum. These two direct ropes are oppositely wound around the drum so that as one unwinds, the other will wind up and vice versa. These ropes will also contribute to the action in raising and lowering the elevator and counter-weight and, as they form a direct connection between the car and the drum, and the counter-weight and the drum, the drum cannot slip relatively to the car or counter-weight and thus relatively to the traction ropes. By this arrangement the only rope necessary on the drum is practically a length of rope equal to the run of the elevator, which length is made up by the coiling of one of the two direct ropes on the drum. The only other surface necessary is a surface large enough for the wrapping of the traction ropes on the drum.

By this arrangement the ropes need have very little angular deflection. For illustration, if three-quarter inch ropes are used and if the pitch of the screw-thread on the drum is one inch for each turn and if the circumference of the drum is ten feet, the angular deflection of the ropes in the elevator well will be less than one-half of a degree which is so slight that it can be neglected.

This construction also greatly simplifies the parts as all that is necessary is to arrange a single drum at the top of the elevator well or at any suitable point to engage the ropes between the counter-weight and the car.

The invention may be practiced in many different ways, some of which are shown in the accompanying drawings, referring to which, Figure 1 is a view of a construction employing a single traction rope and showing the car in its uppermost position. Fig. 2 is a similar view showing the car in its lowermost position. Fig. 3 is a side elevation of the arrangement shown in Figs. 1 and 2. Fig. 4 is an elevation of the driven drum.

Fig. 5 is a diagrammatic perspective view illustrating the wrapping and coiling of the ropes on the drum. Fig. 6 is a view similar to Fig. 1 illustrating the use of three traction ropes and showing the preferred form of invention. Fig. 7 is a diagrammatic perspective view illustrating the wrapping and coiling of the ropes on the drum in the arrangement shown in Fig. 6. Fig. 8 is a view showing an equalizing device for the ropes, and Fig. 9 is a diagrammatic view illustrating an arrangement by which the driven drum can be placed at the bottom of the well or at an intermediate point.

Referring now to the first sheet of drawings, C designates a suitable elevator car or cage and W a counter-weight, which parts may be arranged for vertical movement on any of the usual guide-ways, as is well understood in the art. At the top of the elevator well is journaled a driven drum D. This driven drum preferably has a screw-threaded groove $d$ cut in its periphery, as illustrated in Fig. 4.

15 designates a traction rope. This rope is connected at one end to the top of the elevator car and at the other end to the counter-weight. This rope is given a turn and a half around the driven drum, as shown diagrammatically in Fig. 5. By this arrangement, if the drum is turned one way or the other, the friction or traction of the rope on the drum will cause the car to go up or down, depending upon which way the drum is rotated. The drum may be rotated by a suitable worm and worm wheel and electric motor E, as illustrated in the drawings, which motor may be controlled by any of the usual switches and rheostats so that the attendant on the car can cause the motor to rotate the drum in either direction or so that power can be shut off and the car stopped. The traction rope 15 is preferably wound upon the drum so that when the car is at its upper position, as shown in Fig. 1, the rope will leave the drum at about the center of the well so that as the elevator car approaches its upper limits of travel, the lift will be about at its center of gravity. As the car comes to the bottom of the well, as shown in Fig. 2, say at the bottom of a two hundred foot run and using the figures above referred to, the sidewise deflection of the rope, owing to the screw pitch of the groove will be only about twenty inches, a factor that can be entirely neglected in a two hundred foot run.

In order to prevent slippage or displacement of the traction rope on the drum, the following means is provided. A rope 14 is connected at one end to the car and at its other end is connected to the drum as at 140. This rope is made a little longer than the elevator run and is trained around the drum so that when the car is at the top of its run, as illustrated in Fig. 1, practically all the rope comes on the drum. Another rope 16 is connected at 160 to the drum and at its other end to the counter-weight. This rope is wound around the drum so that when the counter-weight is in its highest position, as shown in Fig. 2, practically all of the rope comes on the drum. The rope 14 being directly connected from the drum to the car will also act as a rope to lift the car. The rope 16 being directly connected from the drum to the counter-weight will also act as a rope to lift the counter-weight. Thus in combined effect, the ropes 14 and 16 will serve as another operating rope between the counter-weight and car. These ropes permanently connecting the drum and the car and the drum and the counter-weight will serve to prevent any slippage between the periphery of the drum and the car and counter-weight and hence the traction rope 15 will always work in the same grooves and will not creep axially on the drum.

It will be seen by the before described apparatus, that the drum practically need only be made of a length sufficient to receive a rope equal to the elevator run as the ropes 14 and 16 are oppositely turned around the drum so that one unwinds as the other winds up following each other along the screw-threaded groove of the drum. Thus the rope 15 acts with a traction engagement on the drum which traction engagement may be called a positive traction because there is no chance for slippage between the periphery of the drum and the coiling of the rope 15 about the same, owing to the employment of the positive ropes 14 and 16. In practice, I take advantage of this fact and employ a plurality of traction ropes. This does not render it necessary to make the drum much wider because the only surface of the drum that is needed for each traction rope is practically two grooves thereon. Therefore by this arrangement, I can use as many traction ropes as desired, depending on the conditions encountered, without materially increasing the size of the drum.

In Fig. 6, a preferred arrangement is illustrated. In this arrangement, in addition to the traction rope 15 I employ two other traction ropes 152 and 153 arranged closely adjacent to, and parallel with, the traction rope 15. This gives in effect four lifting ropes to the car and four lifting ropes to the counter-weight and makes a very safe and efficient arrangement for long run elevators. The way the ropes are coiled and wound on the drum in this form is diagrammatically illustrated in Fig. 7. It also will be noticed that as a single drum is employed, the same can be conveniently placed at the top of the elevator well and can be of such a size that when the elevator car is at the top of its run the four ropes which act to lift the car can lead off the drum substantially in line with the center of the car, and so that when the counter-weight is at the top of its run the four ropes which act to lift the same can lead off the drum in line with the center of the counter-weight. The counter-weight is placed at one side of the elevator well, as illustrated in Figs. 1 and 6 for this purpose. In this arrangement, the drum need only be made of a length practically half the width of the elevator well. The four ropes extending to either or both the car or counter-weight, may be united and connected to any desired form of equalizer, as shown in Fig. 8, so that the same tension will come on all ropes all the time. By this described arrangement, a large portion of the work, practically three-fourths thereof, is done by the traction ropes 15, 152 and 153, and the other quarter by the two direct ropes 14 and 16. The direct ropes 14 and 16 will act to prevent at all times any slippage between the periphery of the drum and the traction ropes. By this arrangement, as the drum can be made of large diameter and as there is no slippage, there is very little wear on the ropes and the device will last for a long time. The drum can be applied to the ropes at any convenient point between the car and counter-weight.

In Fig. 9 an arrangement is shown by which the drum D can be placed at the bottom of the elevator well by using idler sheaves 20 and 21 at the top of the well. In a similar way the drum can be placed at any intermediate point desired.

Many other modifications can be made for practising my invention without departing from the scope thereof as expressed in the claims.

Having thus fully described my invention, what I claim and desire to secure by Letters-Patent is:—

1. In an elevator, the combination with a car and counter-weight, of a rope connecting the same, a driven drum around which the rope is coiled a number of full turns and a half turn to obtain a traction engagement therewith, and traction means supplemental to said rope and working in unison therewith for preventing slipping of said rope relatively to the drum.

2. In an elevator, the combination with a car and counter-weight, of a rope connecting the same, a driven drum having a screw-threaded groove cut thereon around which the rope is coiled to obtain a traction engagement therewith, and traction supplemental means working in unison therewith for preventing the slippage of said rope relatively to the drum.

3. In an elevator, the combination with a car and counter-weight, and a rope connecting the same, of a driven drum around which the rope is coiled to obtain a traction engagement therewith, and a direct acting rope connected to the drum and to the car.

4. In an elevator, the combination with a car and counter-weight, and a rope connecting the same, of a driven drum about which the rope is coiled to obtain a traction engagement therewith, and a direct acting rope connected to the drum and to the counter-weight.

5. In an elevator, the combination with a car and counter-weight, and a rope connecting the same, of a driven drum about which the rope is coiled to obtain a traction engagement therewith, a direct acting rope connected to the drum and to the car, and a direct acting rope connected to the drum and counter-weight, the two direct acting ropes being oppositely trained about the drum.

6. The combination of a car, a counter-weight, a plurality of ropes arranged side by side and connecting the car and the counter-weight, a driven drum around which the ropes are coiled a number of full turns, and a half turn, to obtain a traction engagement therewith, and supplemental means connecting said car and said counter-weight to said drum, said ropes and said supplemental means being so disposed that they move substantially in unison longitudinally of the drum as the car rises or descends.

7. The combination of an elevator car, a counter-weight, a plurality of ropes connecting the car and the counter-weight and arranged side by side, a driven drum having a screw threaded groove cut therein around which said ropes are coiled to obtain a traction engagement therewith, and supplemental ropes connected to said drum and to said car and counter-weight, said supplemental ropes forming a plurality of coils around said drum in said grooves and the total length of said coils being substantially equal to the run of the car.

8. The combination of a car and counter-weight, a plurality of ropes connecting the same, a drum having a screw threaded groove cut therein around which said ropes each are given a number of full turns and a half turn to obtain a traction engagement therewith, and traction means supplemental to said traction ropes for preventing slippage between the traction ropes and drum.

9. The combination of a car and counter-weight, a plurality of ropes connecting the same, a drum having a screw-threaded groove cut therein around which said ropes are each given a number of full turns and a half turn to obtain a traction engagement therewith, and means for preventing slippage between said ropes and the drum comprising a direct acting rope connected to the drum and to the car.

10. The combination of a car and counter-weight, a plurality of ropes connecting the same, a drum having a screw-threaded groove cut therein around which said ropes are each given a number of full turns and a half turn to obtain a traction engagement therewith, and means for preventing slippage of said ropes on the drum comprising a direct acting rope connected to the drum and to the counter-weight.

11. The combination of a car and counter-weight, a plurality of ropes connecting the same, a drum having a screw-threaded groove cut therein around which said ropes are each given a number of full turns and a half turn to obtain a traction engagement therewith, and means for preventing slippage of said ropes on the drum comprising a direct acting rope connected to the drum and to the car, and another direct acting rope connected to the drum and counter-weight, the two direct acting ropes being oppositely wound on the drum.

12. The combination of a car and counter-weight, three ropes connecting the same and arranged side by side, a drum having a screw-threaded groove cut on the periphery thereof around which said ropes are coiled to obtain a traction engagement therewith, and means for preventing slipping of said ropes on the drum.

13. The combination of a car, a counter-weight, three ropes connected between the same, a drum having a screw-threaded groove cut on the periphery thereof around which said ropes are coiled to obtain a traction engagement therewith, and means for preventing slipping of said ropes on the drum comprising a direct acting rope connected to the drum and car.

14. The combination of a car, a counter-weight, three ropes connected between the same, a drum having a screw-threaded groove cut on the periphery thereof around which said ropes are coiled to obtain a traction engagement therewith, and means for preventing slipping of the ropes on the drum comprising a direct acting rope connected to the drum and counter-weight.

15. The combination of a car, a counter-weight, three ropes connected between the same, a drum having a screw-threaded groove cut on the periphery thereof around which said ropes are coiled to obtain a traction engagement therewith, and means for preventing slipping of said ropes on the drum comprising a direct acting rope connected to the drum and car, and a direct acting rope connected to the counter-weight and drum, the direct acting ropes being oppositely turned on the drum.

16. The combination of a car, a counter-weight arranged at one side of the center of the car, a rope connecting the car and counter-weight, and a driven drum having a screw-threaded groove around which the rope is coiled to obtain a traction engagement therewith, the rope extending in a straight line from the drum to the car and to the counter-weight and the parts being arranged so that when the car is in its upper position the rope will extend from the drum to the car in substantially a vertical line and so that when the counter-weight is in its upper position the rope will extend from the drum to the counter-weight in substantially a vertical line.

17. The combination of a car, a counter-weight arranged at one side of the center of the car, a plurality of ropes connecting the car and counter-weight, and a driven drum having a screw-threaded groove around which the ropes are coiled to obtain a traction engagement therewith, the rope extending in a straight line from the drum to the car and to the counter-weight, and the parts being arranged so that when the car is in its upper position the ropes will extend from the drum to the car in substantially a vertical line and so that when the counter-weight is in its upper position the ropes will extend from the drum to the counter-weight in substantially a vertical line.

18. The combination of a car, a counter-weight arranged at one side of the center of the car, a rope connected to the center of the car and the center of the counter-weight, a driven drum having a screw-threaded groove around which the rope is coiled to obtain a traction engagement therewith, the parts being arranged so that when the car is in its upper position the rope will extend from the drum to the car in a line substantially parallel to the line of travel of the car and so that when the counter-weight is at its upper position the rope will extend from the drum to the counter-weight in a line substantially parallel to the line of travel of the counter-weight, and a rope connected to the car and to the drum and turned around the drum so as to be substantially wound thereon when the car is in its upper position.

19. The combination of a car, a counter-weight arranged at one side of the center of the car, a rope connected to the center of the car and the center of the counter-weight, a driven drum having a screw-threaded groove around which the rope is coiled to obtain a traction engagement therewith, the parts being arranged so that when the car is in its upper position the rope will extend from the drum to the car in a line substantially parallel to the line of travel of the car and so that when the counter-weight is at its upper position the rope will extend from the drum to the counter-weight in a line substantially parallel to the line of travel of the counter-weight, and a rope connected to the counter-weight and drum and turned around the drum so as to be substantially wound thereon when the counter-weight is in its upper position.

20. The combination of a car, a counter-weight arranged at one side of the center of the car, a rope connected to the center of the car and the center of the counter-weight, a driven drum having a screw-threaded groove around which the rope is coiled to obtain a traction engagement therewith, the parts being arranged so that when the car is in its upper position the rope will extend from the drum to the car in a line substantially parallel to the line of travel of the car and so that when the counter-weight is at its upper position the rope will extend from the drum to the counter-weight, in a line substantially parallel to the line of travel of the counter-weight, a rope connected to the car and to the drum and turned around the drum so as to be substantially wound thereon when the car is in its upper position, and a rope connected to the counter-weight and drum and turned around the drum so as to be substantially wound thereon when the counter-weight is in its upper position.

21. The combination of a car, a counter-weight arranged at one side of the center of the car, a plurality of ropes connected to the center of the car and counter-weight, a driven drum having a screw-threaded groove around which the ropes are coiled to obtain a traction engagement therewith, the parts being arranged so that when the car is in its upper position the ropes will extend from the drum to the car in a line substantially perpendicular to the center of the car and so that when the counter-weight is in its upper position the ropes will extend from the drum to the counter-weight in a line substantially parallel to the line of travel of the counter-weight, and a rope connected to the car and drum and turned around the drum so as to be substantially wound thereon when the car is in its upper position.

22. The combination of a car, a counter-weight arranged at one side of the center of the car, a plurality of ropes connected to the center of the car and counter-weight, a driven drum having a screw-threaded groove around which the ropes are coiled to obtain a traction engagement therewith, the parts being arranged so that when the car is in its upper position the ropes will extend from the drum to the car in a line substantially perpendicular to the center of the car and so that when the counter-weight is in its upper position the ropes will extend from the drum to the counter-weight in a line substantially parallel to the line of travel of the counter-weight, and a rope connected to the counter-weight and drum and turned around the drum so as to be substantially wound thereon when the counter-weight is in its upper position.

23. The combination of a car, a counter-weight arranged at one side of the center of the car, a plurality of ropes connected to the center of the car and counter-weight, a driven drum having a screw-threaded groove around which the ropes are coiled to obtain a traction engagement therewith, the parts being arranged so that when the car is in its upper position the ropes will extend from the drum to the car in a line substantially perpendicular to the center of the car and so that when the counter-weight is in its upper position the ropes will extend from the drum to the counter-weight in a line substantially parallel to the line of travel of the counter-weight, a rope connected to the car and to the drum and turned around the drum so as to be substantially wound thereon when the car is in its upper position, and a rope connected to the counter-weight and drum and turned around the drum so as to be substantially wound thereon when the counter-weight is in its upper position.

24. In an elevator, the combination with a car, and a counter-weight, of a rope connecting the same, a driving drum around which the rope is coiled a number of full turns and a half turn to obtain a traction engagement therewith, and supplemental means connecting said car and said counter-weight to said drum and working in unison with said rope to prevent the slipping of said rope on said drum.

In testimony whereof I have hereunto set my hand, in the presence of two subscribing witnesses.

THURE LARSSON.

Witnesses:
Louis W. Southgate,
C. Forrest Wesson.